Jan. 15, 1957 R. S. LANIER 2,777,352
WORK DRIVER
Filed Nov 6, 1952
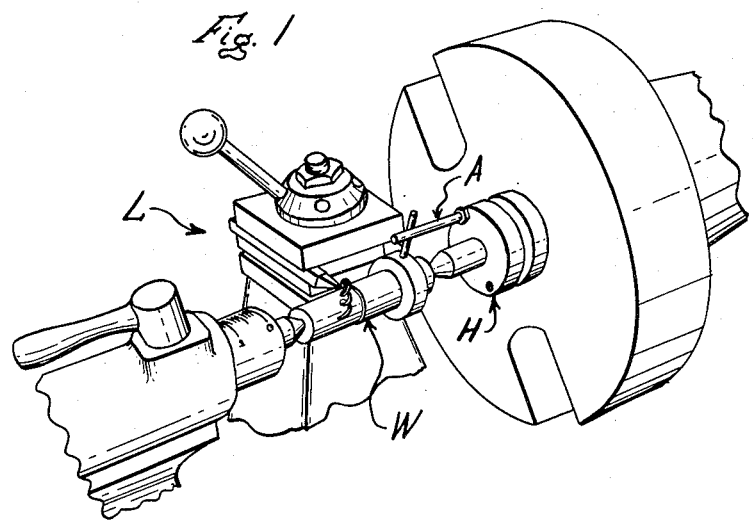
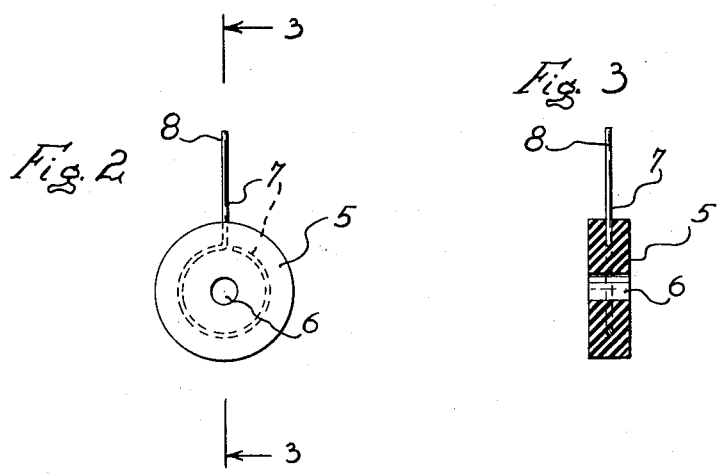
INVENTOR
REGINALD S. LANIER
BY Williamson, Williamson,
Schroeder & Adams ATTORNEYS

United States Patent Office 2,777,352
Patented Jan. 15, 1957

2,777,352

WORK DRIVER

Reginald S. Lanier, Minneapolis, Minn., assignor to Washington Machine & Tool Works, Inc., Minneapolis, Minn., a corporation Application November 6, 1952, Serial No. 319,142

2 Claims. (Cl. 82—41)

This invention relates to work holders or lathe carriers. More particularly, it relates to devices designed to engage a piece of work to be turned with a lathe or grinder and to connect the piece of work with the driving head thereof in driving relation.

It is a general object of my invention to provide a novel and improved work holder or lathe carrier of extremely cheap and simple construction and operation.

A more specific object is to provide a work holder expendible in nature which can be manufactured at extremely low cost and will function in an improved manner.

A still more specific object is to provide a lathe carrier or work holder which can be readily modified to the size of the piece of work to be turned and can be applied to the work with ease and with a saving of time and effort.

Another object is to provide a work holder or lathe carrier which can be applied to the piece of work to be turned with a minimum of time and effort, is re-usable for a considerable number of times, and is so cheap to manufacture that it may be discarded at will.

Another object is to provide a work carrier which can be readily modified to hold a piece of work of given diameter and which can be repeatedly used for holding additional pieces of work of substantially the same diameter without further modification or adjustment.

Another object is to provide a work carrier which will hold the piece of work against slipping more efficiently and can be more easily applied to such work than other types of lathe carriers previously known.

These and other objects and advantages of my invention will more fully appear from the following description made in connection with the accompanying drawings, wherein like reference characters refer to the same or similar parts throughout the several views, and in which:

Fig. 1 is a perspective view of one embodiment of my invention being used to hold a piece of work for turning the same in conjunction with a lathe;

Fig. 2 is a side elevational view of one embodiment of my invention; and

Fig. 3 is a vertical sectional view taken along line 3—3 of Fig. 2.

Fig. 1 shows a lathe indicated generally as L utilizing one embodiment of my invention to engage and drive the piece of work W to be turned in the lathe. For the sake of convenience, it will be described herein in conjunction with a lathe but it is to be understood that it has equal advantages for use in conjunction with a grinder or the like. As shown, the lathe L has a drive head or disc H from which a driving arm A extends outwardly parallel to the work and longitudinally of the lathe. The lathe and the parts hereinbefore described are conventional parts of certain types of lathes and each lathe commonly known either has the same or a mechanical equivalent for such parts, the driving head H and the driving arm A serving to engage in a firm manner the work W so as to drive the same to cause it to rotate about its longitudinal axis. My invention is directed toward providing a novel and improved means for placing the driving arm A in driving relation to the work W.

As best shown in Figs. 2 and 3, one embodiment of my invention may include an oil-resistant rubber disc 5 having a small axial opening 6 extending therethrough. This disc 5 is preferably made of rubber of a semi-rigid nature and having considerable resiliency. Imbedded within the body of the disc 5, as best shown in Fig. 2, is a small metal rigid rod 7 which is substantially circular in shape and is arranged concentrically around the opening 6 as best shown in Fig. 2. One end portion of this rod 7 extends outwardly through the circumference of the rubber disc 5 and radially thereto to provide a dog member 8 for the disc 5. As best shown in Fig. 1, this dog member 8 serves to engage the driving arm A of the lathe and is sufficiently long for that purpose.

The rigid rod 7 in addition to providing a dog member 8 for the disc 5, also provides rigidity for the disc and prevents the disc from deforming in shape to an undesirable extent. In other words, the circular portion of the rod 7 serves as a reinforcement member within the interior of the molded disc 5 and serves to prevent the material which defines the opening 6 from yielding to such an extent as to permit the piece of work W which is received within the opening 6 from slipping relative to the disc.

In use, a disc 5 having the desired size of opening 6 may be selected or the opening 6 may be reamed out to a diameter slightly less than the diameter of the piece of work to be turned and thereafter the piece of work is inserted into this enlarged opening 6 so that the rubber of the disc 5 defining the opening 6 will positively engage the piece of work W and prevent the same from turning relative to the disc. After this has been done, the piece of work is centered in the lathe and the driving arm A will then engage the dog member 8 and drive the piece of work in a very efficient manner and without slipping. When the piece of work has been turned as desired, it is a simple matter to slip the disc 5 off the end of the piece of work and to re-use the same upon another piece of work having substantially the same diameter. If a large piece of work is to be used, then of course a larger disc 5 must be used and the diameter of the circular portion of the rod 7 must be increased accordingly.

One of the advantages of my invention is that this work holder or lathe carrier is so cheap and simple in construction and use. It can be readily seen that it may be applied to the piece of work with a minimum of effort and time-consumption. At the same time, if the rubber which defines the opening 6 becomes worn or loses its elasticity, it may be thrown away and a new work holder utilized since the cost of manufacturing such a holder is quite negligible. They can be manufactured in large quantities and at very low cost and hence they are expendible in nature.

It should be noted that the circular portion of the rod 7 insures that the rubber material between this circular portion and the opening 6 has sufficient rigidity so that it will not yield to such an extent that the piece of work will slip. At the same time the rubber has sufficient gripping qualities so that sufficient friction is provided to prevent any tendency for such slippage. The rod 7 precludes gross distortion of the disc 5 which might otherwise cause slippage despite the adhesive qualities of the rubber.

It should also be noted that my work holder or lathe carrier can be manufactured in a number of convenient sizes or it can be quickly adapted to receive a piece of work of any predetermined diameter by merely reaming out the central portion of the disc within the circular portion of the rod 7. Once the disc has been modified to the desired diameter it may be quickly applied to the piece of work for the turning operation and at the termination of the turning operation can be equally as quickly removed from the piece of work. It should also be noted that such a lathe carrier or work holder can be used repeatedly for a number of pieces of work, and when these pieces of work are of constant diameter a very substantial saving in time can be accomplished because there is no time required to modify the lathe carrier. A single lathe carrier may be used repeatedly for a large number of pieces of work and thus a substantial saving in time and effort is accomplished. There is no need to adjust a plurality of set screws or the like in order to properly secure the piece of work against slipping relative to the lathe carrier as is the case in many conventional carriers.

One very important use of my invention will be in conjunction with grinders under an arrangement where the carrier or work holder as disclosed in Figs. 2 and 3 will be utilized to engage and hold a piece of work while a grinder is applied thereto to quickly and more efficiently grind a surface of the piece of work. The facility with which a piece of work may be inserted into my work holder and removed therefrom makes it highly desirable as a means for holding a piece of work in such operations.

One very important advantage of my work holder is that because of its resilient nature it will not mar the surface of precision-turned or ground parts at the points at which it engages these parts. These precision-turned or ground parts must be held to close tolerances and the set screws and other securing devices commonly found in other work holding tools make it extremely difficult to hold such tolerances because they do mar the surfaces of such parts at the points of engagement. Since my work holder is formed of a resilient material which cannot possibly score the outer surface of such precision-turned or ground parts, there is no danger that these tolerances will be exceeded.

It will of course be understood that various changes may be made in the form, details, arrangement and proportions of the various parts without departing from the scope of my invention.

What I claim is:

1. A work carrier comprising a semi-rigid rubber body having a central opening formed therethrough adapted to be readily modified in size to receive the piece of work to be turned within a lathe in close-fitting engaging and driving relation, a rigid rod member having a pair of end portions one of which is bent into a substantially circular shape and imbedded within said body, the diameter of said circular end portion being larger than the diameter of the piece of work to be held by said body, the other end portion of said rod extending outwardly beyond the confines of said body and constituting a rigid dog member, said end portion extending outwardly from said body to engage the drive arm of the lathe and drive the piece of work held by said body during turning operations.

2. A work carrier comprising a semi-rigid rubber disc having a central opening formed therethrough adapted to be readily modified in size to receive the piece of work to be turned within a lathe in close-fitting engaging and driving relation, a rigid rod member of small diameter having a pair of end portions, one of which is bent into a substantially circular shape and imbedded in said disc and extends substantially concentrically around the opening of said disc, the other end portion of said rod member extending outwardly and substantially radially away from said disc, the diameter of said imbedded end portion being greater than the diameter of the piece of work to be turned within the lathe, said circular end portion providing firmness to such engagement by said disc, said radially extending portion constituting a dog adapted to engage the drive arm of a lathe and drive the piece of work to be turned therein when such piece of work is received in the opening of said disc.

References Cited in the file of this patent

UNITED STATES PATENTS

| | | |
|---|---|---|
| 418,464 | Holmes | Dec. 31, 1889 |
| 877,882 | Blum | Jan. 28, 1908 |
| 1,304,663 | Crosswicks | May 27, 1919 |
| 1,323,850 | Fisher | Dec. 2, 1919 |
| 1,779,311 | Gates | Oct. 21, 1930 |
| 1,892,037 | Crews | Dec. 27, 1932 |
| 1,913,198 | Geyer | June 6, 1933 |
| 2,290,011 | Bahr | July 14, 1942 |
| 2,552,694 | Stoner | May 15, 1951 |
| 2,593,907 | Marshall | Apr. 22, 1952 |
| 2,612,013 | Loader | Sept. 30, 1952 |